United States Patent [19]

Baversten

[11] Patent Number: 5,295,458
[45] Date of Patent: Mar. 22, 1994

[54] STEAM LINE PLUG SUPPORT TOOL

[75] Inventor: Bengt I. Baversten, Simsbury, Conn.

[73] Assignee: Combustion Engineering, Inc., Windsor, Conn.

[21] Appl. No.: 997,782

[22] Filed: Dec. 29, 1992

[51] Int. Cl.$^5$ ............................................. F22B 37/42
[52] U.S. Cl. ..................................... 122/504; 73/49.1; 138/89; 165/76; 376/204
[58] Field of Search ............... 122/504, 510, DIG. 14; 376/204; 138/89, 90; 165/76, 78; 73/49.1

[56] References Cited

U.S. PATENT DOCUMENTS

| | | | |
|---|---|---|---|
| 4,470,946 | 9/1984 | Vassalotti et al. | 376/204 |
| 4,584,162 | 4/1986 | Yoli | 376/204 |
| 4,624,824 | 11/1986 | Dooley | 376/204 |
| 4,652,418 | 3/1987 | Baric et al. | 376/204 X |

Primary Examiner—Edward G. Favors
Attorney, Agent, or Firm—Ronald P. Kananen; John H. Mulholland

[57] ABSTRACT

A steam line plug support tool for maintaining steam line plugs in steam line nozzles during the local leak rate test of boiling water reactors which includes an elongated beam with a support piece attached at a location to coincide with the steam line plug. The steam line plug support tool may optionally have a steam line plug attached to the support plate so that the support tool may be used for both installation and support.

25 Claims, 2 Drawing Sheets

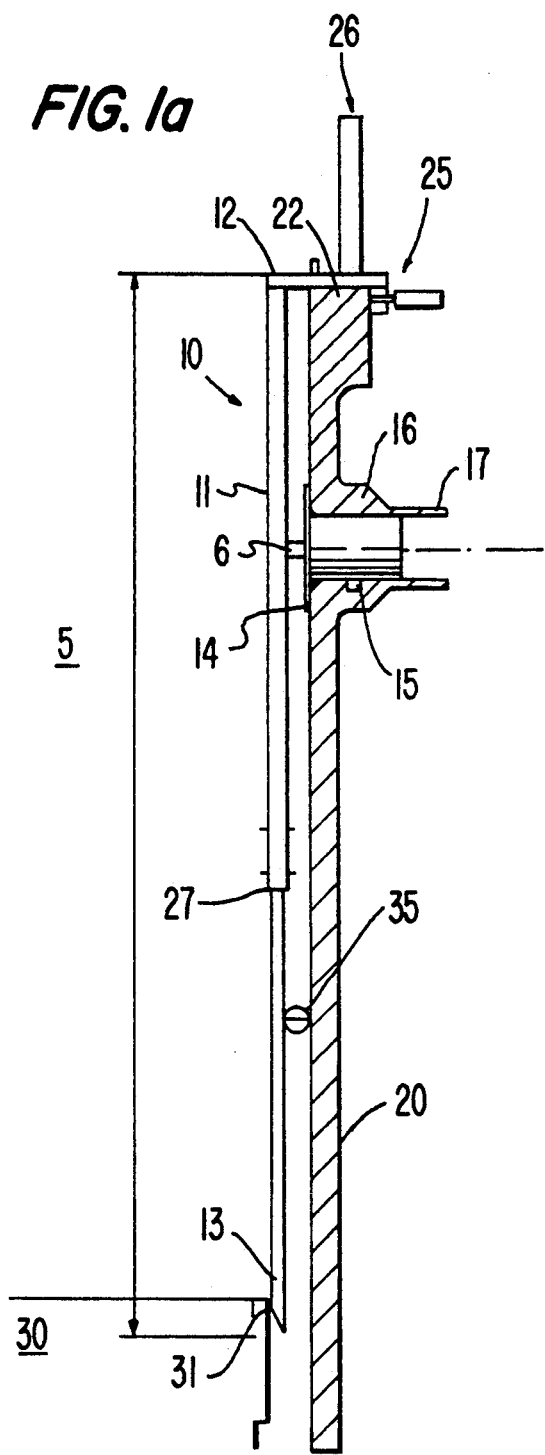
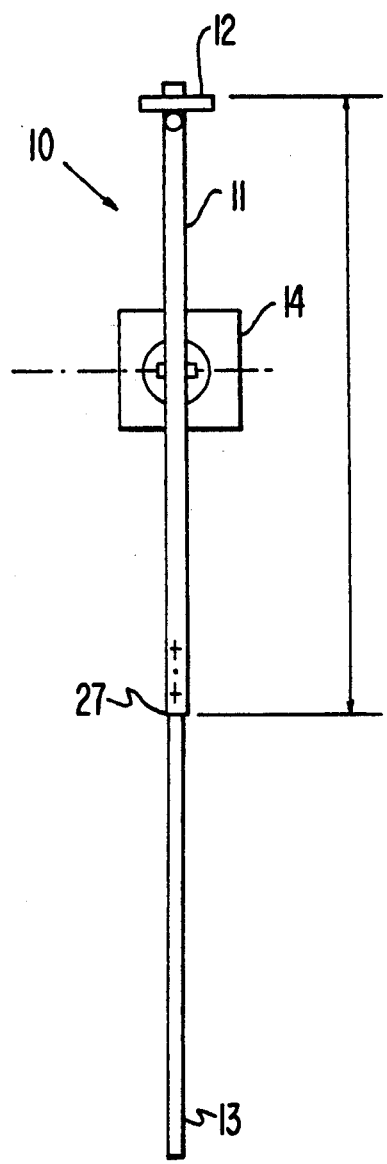

STEAM LINE PLUG SUPPORT TOOL

FIELD OF THE INVENTION

This invention relates to a support tool and, more particularly, to a support tool for maintaining steam line plugs supported in the steam line nozzles during the local leak rate test of boiling water reactors. Still more particularly, this invention relates to a steam line plug installation and support tool.

BACKGROUND OF THE INVENTION

Steam line plugs are installed in the steam line nozzles of boiling water reactors for inspection and maintenance of the steam line system of the reactor. Generally, the plugs are of two types. One type of plug is only used to prevent the steam line from being filled with water. A positive head of water on the reactor side of the plug keeps the plug inserted in the steam line nozzle while the line is drained. The plug may contain a vent valve operated remotely to allow the steam lines to refill after maintenance. This type of plug, however, cannot withstand the back pressure which results from the local leak rate testing of the main steam valve closest to the plug. A force of approximately 50 psi will force the plug from the steam line nozzle.

Another type of plug has been developed to withstand the back pressure from the local leak rate testing of the main steam valve closest to the plug. In order to absorb the load resulting from the back pressure and remain in place in the steam line, however, this plug must incorporate an elaborate expansion device. The expansion device may include hydraulically expanded rings to lock the steam line plug against back pressure. It is, thus, a problem in the prior art to provide a steam line plug which is of simple design and does not require elaborate expansion devices, and yet is able to withstand the local leak rate test pressure and remain in place in the steam line.

SUMMARY OF THE INVENTION

It is an object of the present invention to provide a support tool which will allow a steam line plug, without elaborate expansion devices, to withstand various pressures including the local leak rate test pressure.

It is a further object of the present invention to provide a steam line plug support tool that is easy to install and use.

It is a further object of the present invention to provide a steam line plug support tool which is of simple construction and can be used with various reactors and facilities.

Additional objects, advantages and novel features of the invention will be set forth in the description which follows, and will become apparent to those skilled in the art upon reading this description or practicing the invention. The objects and advantages of the invention may be realized and attained by the invention of appended claims.

To achieve the foregoing and other objects, in accordance with the present invention, as embodied and broadly described herein, a steam line plug support tool for maintaining steam line plugs in the steam line nozzle of a boiling water reactor vessel comprising: an elongated beam of a length to fit along the length of a reactor vessel wall between a flange of the vessel wall and a shroud of the vessel, wherein said beam has a first end and a second end; an attachment section connected to said beam first end for attachment to the flange of the vessel wall, wherein said elongated beam when attached to the vessel wall is supported at its first end from said flange of said vessel wall and extends to its second end which is supported by the shroud of the reactor vessel; and a plug support plate attached at a point along the length of said elongated beam to coincide with a steam line plug in a steam line nozzle in the reactor vessel adapted to support the steam line plug against pressure in the steam line. Further, in another embodiment of the present invention, the steam line plug may be attached to a sliding support plate so that the support tool may be used for both installation and support.

BRIEF DESCRIPTION OF THE DRAWINGS

The accompanying drawings, which are incorporated in, and form part of, the specification, illustrate an embodiment of the present invention and, together with the description serve to explain the principle of the invention. In the drawings:

FIG. 1a is a side view of the support tool of the present invention installed in a reactor vessel.

FIG. 1b is a back view of the support tool shown in FIG. 1a.

FIG. 2c is a back view of the support tool shown in FIG. 2a.

DETAILED DESCRIPTION

Figure 2A:
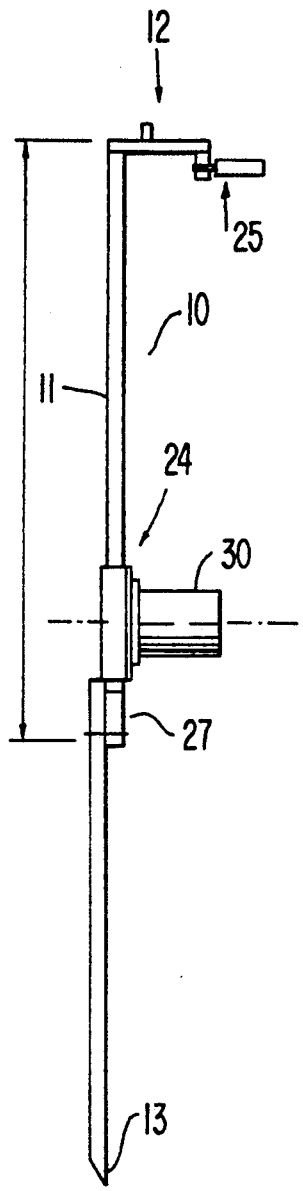
FIG. 2a is a side view of another embodiment of the support tool of the present invention.

Reference will now be made in detail to the preferred embodiment of the present invention, an example of which is illustrated in the accompanying drawings.

Illustrated in FIGS. 1a and 1b is the steam line plug support tool 10 of the present invention. A steam line plug 15 is shown inserted in a steam line nozzle 16 in a wall 20 of a reactor vessel 5. A shroud, an internal vessel for holding the reactor fuel in the reactor vessel, is shown at 30. A feedwater sparger for the vessel is shown at 35.

The plug 15 is inserted in nozzle 16 for inspection and maintenance of a steam line 17. The plug 15 allows the reactor vessel 5 to remain filled with water while the steam line 17 is drained and maintenance tests are conducted on the line. The plug 15 prevents the steam line 17 from being filled with water, and, with use of the support tool 10 of the present invention, will withstand back pressure in the steam line resulting from, for example, a local leak rate test. While the plug 15 may be any conventional steam plug of complicated or simple design, it is preferably of simple construction. Further, the plug may contain a vent valve operated remotely to allow the steam lines to refill after maintenance.

The support tool 10 consists of a beam 11 which when installed is supported at an upper end 12 from a reactor pressure vessel flange 22 at the top of the vessel wall 20 or a vessel stud 26 by means of a clamp 25. The beam 11 is supported at a lower end 13 by edge 31 of the shroud 30 of the reactor vessel 5. A connection piece 6 is fixed to the support tool at a location along the support tool 10 to coincide with the position of the steam line plug 15 to make surface contact between the tool and the plug 15.

When the support tool 10 is installed and clamped, the connection piece 6 presses the plug 15 towards the nozzle 16 with a force that corresponds, at least, to the maximum local leak rate back pressure. The support tool 10, thereby, supports plug 15 during the local leak rate test so that the plug 15 remains in the nozzle 16 during the test.

The length of the beam 11 of the support tool 10 will vary depending on the upper support point of the tool 10. When the beam 11 is fitted to a flange 22 or stud 26 of the reactor pressure vessel wall 20, it should be of a length to fit from the flange 22 or the stud 26 down to the shroud 30, preferably, approximately 30 feet. The support tool 10 may be constructed from any rigid force absorbing material such as any metal, preferably steel, and still more preferably stainless steel.

The support tool 10 can be divided into two sections for use in plants without sufficient height between the refueling floor and the overhead crane to permit installation of the support tool in one piece or for convenience of storage. The lower section 13 of beam 11 may be attached to beam 11 at the point shown at 27 by any suitable means such as a hinge or bolt, or may be telescopically connected as shown in FIGS. 1a and 1b. A locking mechanism may be used to lock the beam 11 in the outstretched position shown in FIG. 1 such as a pin for use with a hinge connection.

When telescopically connected, the lower section 13 may be retracted into the upper section 12 of beam 11 to create a compact design. The lower section 13 may be pulled out from the upper section 12 and automatically locked into place. The upper and lower sections may be of any length relative to each other which facilitates installation of the beam while still providing support. For example, the ratio of the length of the upper section to the lower section could be 1:1 so that if the entire beam were thirty feet the upper and lower section would each be fifteen feet. Preferably, the ratio between the length of the upper section to the lower section is 3:2 such that if the entire beam were thirty feet the upper section would be eighteen feet and the lower section would be twelve feet.

Figure 2B:
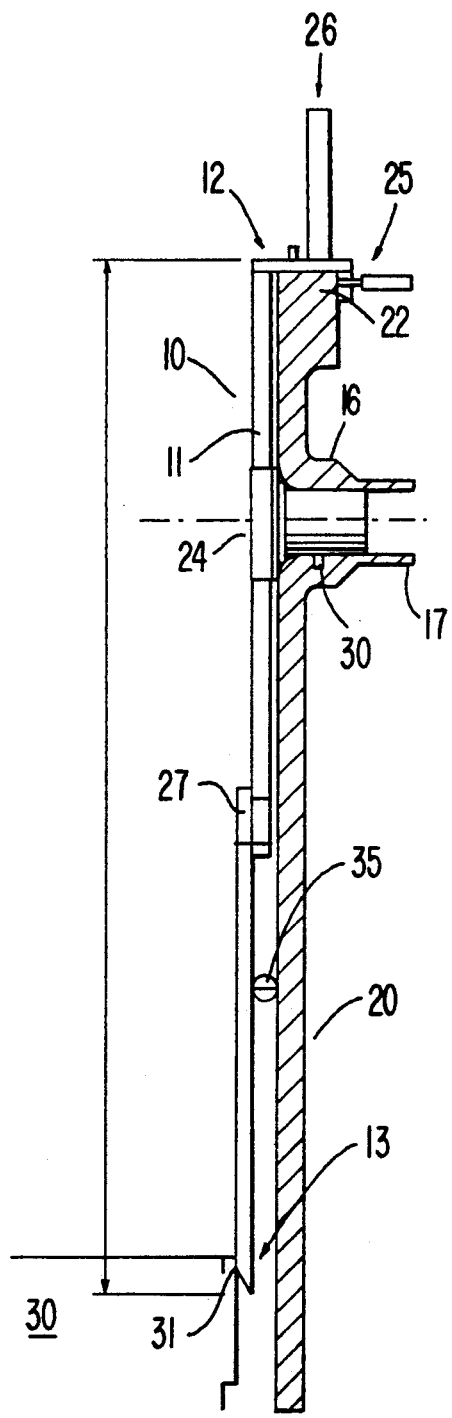
FIG. 2b is a side view of the support tool shown in 2a installed in a reactor vessel.
Figure 2C:
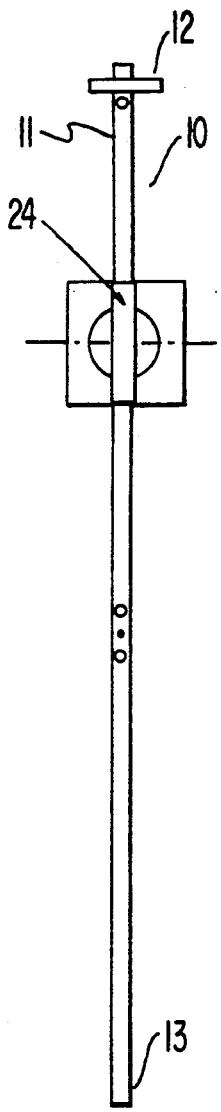

Another embodiment of the present invention is shown in FIGS. 2a-2c. In this embodiment a plug 30 is attached to a sliding plate 24 which is slidably mounted on the beam 11 of support tool 10. The steam line plug 30 is affixed to the plate 24 on the support tool 10 by any suitable means such as bolts or screws. The plate 24 acts as a sliding guide to guide the tool 10 and its position along the tool 10 may be adjusted. FIG. 2a illustrates the tool 10 and the plug 30 in a first position with the plug 30 centered in front of the nozzle 16 of the steam line 17 ready for installation into the nozzle 16. During installation, the tool 10 and the plug 30 are moved into the reactor vessel and steam line 17 from the first position illustrated in FIG. 2a to a second position illustrated in FIG. 2b.

In the second position the tool 10 supports the plug 30 in the nozzle 16 with the upper end 12 hanging from the flange 22 or stud 26 and the lower end 13 supported by the edge 31 of the shroud 30. During installation, as shown in FIGS. 2a and 2b, the plug 30 fits in the nozzle 16 and the tool 10 is then lowered from the first position to the second supporting position. As the support tool 10 is lowered, it slides relative to plug 30 inside the sliding device 24 thereby allowing the tool to adjust itself vertically in relation to the plug. The tool, thus, compensates for differences in height between the nozzle and the vessel flange.

After the steam plug 30 is delivered and installed in the nozzle 16 by the support tool 10, the tool 10 is then clamped to the reactor pressure vessel flange or stud as described in connection with FIGS. 1a and 1b. Because the support tool and the plug are combined, the total installation and clamping time is advantageously reduced. In addition, the embodiment of the invention shown in FIGS. 2a-2c is especially advantageous for use in replacing old steam line plugs with new ones.

The support tool 10 can be installed and used during the local leak rate test period. Further, if testing conditions permit, the support tool 10 can be moved between steam line plugs. The tool 10 is designed to be used underwater, but, as the plugs are installed dry or wet, it may also be used dry.

Accordingly, the present invention provides a simple, low cost device to support and install a steam line plug in steam line nozzles. The support tool of the present invention allows the steam line plug to remain in place while the steam line is drained and tests are conducted on the line which result in a higher pressure on the steam line side of the plug than on the reactor side, such as the local leak test.

I claim:

1. A steam line plug support tool for maintaining steam line plugs in the steam line nozzle of a boiling water reactor vessel comprising:
    an elongated beam of a length to fit along the length of a reactor vessel wall between a flange on the top of the vessel wall and an internal vessel within the reactor vessel, wherein said beam has a first end and a second end;
    an attachment section connected to said beam first end for attachment to the vessel wall, wherein said elongated beam when attached to the vessel wall is supported at its first end from said flange of said vessel wall and extends to its second end, said second end being supported by the internal vessel of the reactor vessel; and
    a support piece attached at a point along the length of said elongated beam to coincide with a steam line plug in a steam line nozzle in the reactor vessel which is adapted to support the steam line plug against pressure in the steam line.

2. A steam line plug support tool according to claim 1, wherein said steam line plug is attached to said plug support piece such that said support tool may also be used to install said plug in the steam line nozzle.

3. The steam line plug support tool according to claim 2, wherein said support piece is slidably disposed on said elongated beam such that after said plug is installed in said steam line nozzle, said elongated beam can be slidably moved relative to said support piece and plug into support position.

4. A steam line plug support tool according to claim 1, wherein said elongated beam comprises an upper portion and a lower portion and said lower portion can be moved relative to said upper portion to ease installation and storage of said tool.

5. A steam line plug support tool according to claim 4, wherein said lower portion is pivotally connected to said upper portion by means of a hinge.

6. A steam line plug support tool according to claim 5, wherein said beam is locked in an extended position by means of a pin in said hinge.

7. A steam line plug support tool according to claim 4, wherein said lower portion is telescopically connected to said upper portion so that said lower section may be retracted into said upper section.

8. A steam line plug support tool according to claim 7, wherein said beam automatically locks into an extended position when said lower portion is withdrawn from said upper portion.

9. A steam line plug support tool according to claim 1, wherein said support tool is made from metal.

10. A steam line plug support tool according to claim 9, wherein said metal is stainless steel.

11. A steam line plug support tool for maintaining steam line plugs in the steam line nozzle of a boiling water reactor vessel comprising:
    an elongated beam of a length to fit along the length of a reactor vessel wall between a flange on the top of the vessel wall and an internal vessel within the reactor vessel, wherein said beam has a first end and a second end;
    an attachment section connected to said beam first end for attachment to the vessel wall, wherein said elongated beam when attached to the vessel wall is supported at its first end from said flange of said vessel wall and extends to its second end, said second end being supported by the internal vessel of the reactor vessel;
    a plug support plate slidably mounted along the length of said elongated beam; and
    a steam line plug attached to said plug support plate to fit into the steam line nozzle in the reactor vessel such that when said beam and said support plate are attached to said vessel said steam line plug is installed in said steam line nozzle and said plug is supported by said plate.

12. A steam line plug support tool according to claim 11, wherein said elongated beam comprises an upper portion and a lower portion and said lower portion can be moved relative to said upper portion to ease installation of said beam.

13. A steam line plug support tool according to claim 12, wherein said lower portion is pivotally connected to said upper portion by means of a hinge.

14. A steam line plug support tool according to claim 13, wherein said beam is locked in an extended position by means of a pin in said hinge.

15. A steam line plug support tool according to claim 12, wherein said lower portion is telescopically connected to said upper portion.

16. A steam line plug support tool according to claim 15, wherein said beam automatically locks into an extended position when said lower portion is withdrawn from said upper portion.

17. A steam line plug support tool according to claim 11, wherein said support tool is made from metal.

18. A steam line plug support tool according to claim 17, wherein said metal is stainless steel.

19. A method of using a steam line plug support tool during inspection and maintenance of steam line nozzles comprising an elongated element having a first end and a second end and a plug support plate attached therebetween at a location to coincide with a steam line plug in a steam line nozzle of a reactor vessel comprising the steps of:
    inserting said support tool from the top of the reactor vessel between a wall of the reactor vessel and an internal vessel such that said support plate is located in front of a steam line plug in a steam line; and
    clamping the first end of said support tool to said vessel wall so that the said second end of said support tool is supported by the internal vessel within the reactor and said support plate retains said steam line plug in said steam line during periods of high pressure in the steam line.

20. The method according to claim 20, further comprising the steps of performing inspection and maintenance tests on said steam line; and moving said support tool to another steam line nozzle upon completion of said tests.

21. The method according to claim 19, wherein said support tool is made from a metal.

22. The method according to claim 22, wherein said metal is stainless steel.

23. A method of inserting and supporting a steam line plug in a steam line nozzle of a reactor vessel comprising the steps of:
    inserting a steam line plug, attached to a steam line plug support plate which is slidably attached on an elongated element having a first and second end, between a wall of the reactor vessel and an internal vessel;
    inserting said steam line plug in the steam line nozzle in the vessel wall;
    sliding said elongate element relative to said plug and said support plate such that said first end of said elongate element is supported by a portion of said vessel wall located above said steam line nozzle and said second end is supported below said steam line nozzle by an internal vessel of the reactor vessel; and
    clamping said first end of said elongated element to said vessel wall such that said support plate retains said plug in said steam line.

24. A method according to claim 23, wherein said support tool is made from a metal.

25. A method according to claim 24, wherein said metal is stainless steel.

* * * * *